Figure 1A:
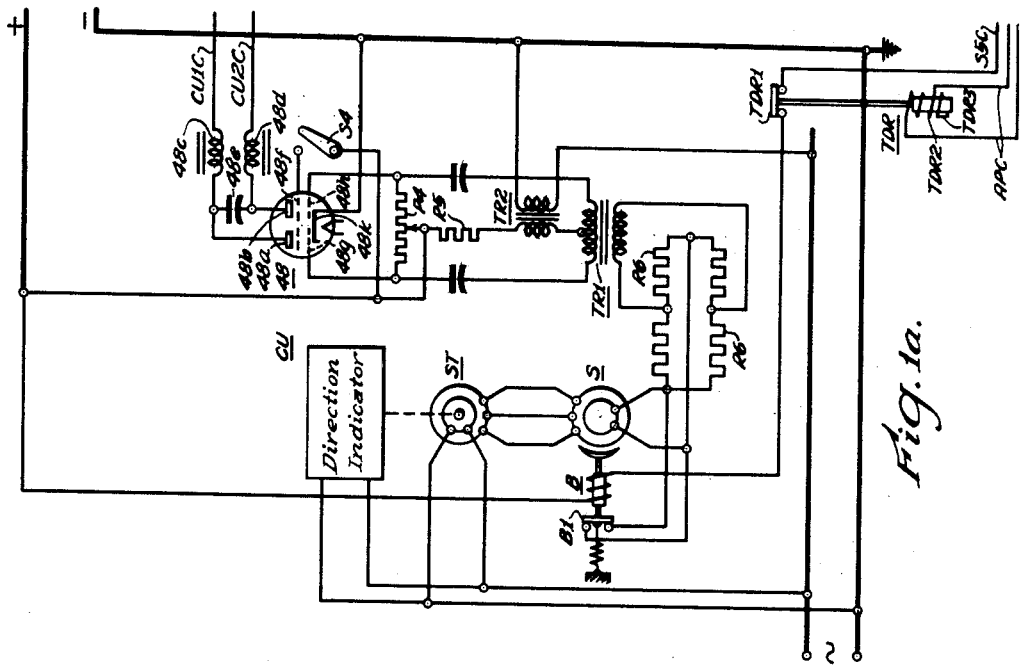

Dec. 30, 1952  C. R. HANNA  2,623,716
GYROSCOPE CONTROL SYSTEM FOR DIRIGIBLE CRAFT
Filed Dec. 11, 1947  2 SHEETS—SHEET 1

WITNESSES:
Robert Baird
E. F. Oberheim

INVENTOR
Clinton R. Hanna.
BY
Paul E. Friedemann
ATTORNEY

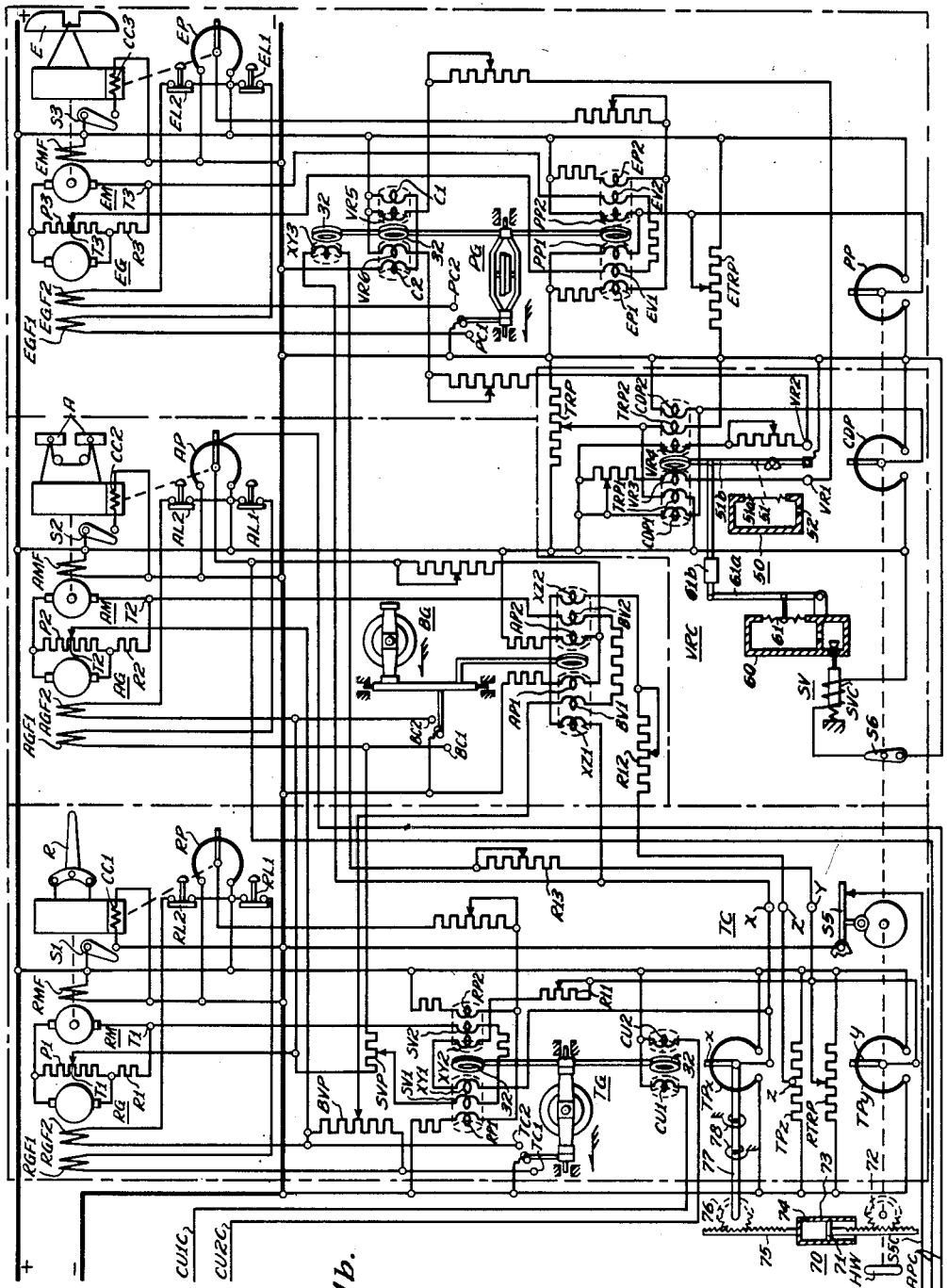

Patented Dec. 30, 1952

2,623,716

UNITED STATES PATENT OFFICE 2,623,716

GYROSCOPE CONTROL SYSTEM FOR DIRIGIBLE CRAFT

Clinton R. Hanna, Pittsburgh, Pa., assignor to Westinghouse Electric Corporation, East Pittsburgh, Pa., a corporation of Pennsylvania Application December 11, 1947, Serial No. 791,105

8 Claims. (Cl. 244—77)

This invention relates generally to systems of control and more particularly to control systems applicable in the control of conveyances operable in space.

The invention is herein illustrated and described as applied in the control of a conventional aircraft utilizing rudders, elevators and ailerons respectively for controlling the craft directionally, longitudinally and laterally. However, it will be appreciated that the invention may be applied to other types of craft utilizing means other than the control surfaces mentioned for effecting maneuverability.

In certain of its aspects this invention relates to a copending application of C. R. Hanna, Serial No. 785,983, filed November 14, 1947, entitled Control Systems and assigned to the same assignee as this invention.

In still other of its aspects this invention is related to a copending application of C. R. Hanna and K. A. Oplinger, Serial No. 785,985, filed November 14, 1947, entitled Control System and assigned to same assignee as this invention.

In a conventional aircraft, the control may be resolved about three mutually perpendicular axes. These are usually referred to as the turn axis, the roll axis and the pitch axis, the turn axis lying vertically of the craft, the roll axis passing longitudinally thereof and the pitch axis extending transversely of the air frame. Control of the craft about the turn, roll and pitch axes is obtained by the control surfaces, respectively, the rudder, the ailerons and the elevators which when displaced from their neutral or streamlined position produce torques about the corresponding control axis rotating the craft therebeabout, the angular deflection of the control surfaces at a given air speed determining the velocity of rotation of the craft about the respective axes. Equilibrium in any flight attitude requires suitable coordination in the application and removal of the control surfaces.

The control system herein disclosed, affording coordinated control surface application for stabilizing the craft when on fixed course control and for maintaining equilibrium in maneuvers, is described in detail in the two above-identified copending applications of C. R. Hanna and C. R. Hanna jointly with K. A. Oplinger. Inasmuch as the present invention is directed primarily to the removal and application of the fixed course signal when entering and leaving a turn certain portions of the system are covered only briefly and further details may be had upon reference to the mentioned copending applications.

One object of this invention is to provide a system of control for a craft operable in space which is simple with respect to operational requirements and effective in operation.

Another object of this invention is to provide a control for a craft operable in space affording coordinated control in all phases of operation.

More specifically it is an object of this invention to provide a system of control for a craft operable in space embodying provisions for fixed course control and coordinated maneuvering control in which the application of the fixed course control upon completion of a maneuver is delayed until the craft is leveled laterally.

The foregoing statements are illustrative of the various aims and objects of this invention. Other objects and advantages will become apparent upon a study of the following descriptive disclosure when considered in conjunction with the accompanying drawings, in which:

Figs. 1a and 1b diagrammatically illustrate a system of control for a craft operable in space, embodying the principles of this invention.

Figures 2, 3:
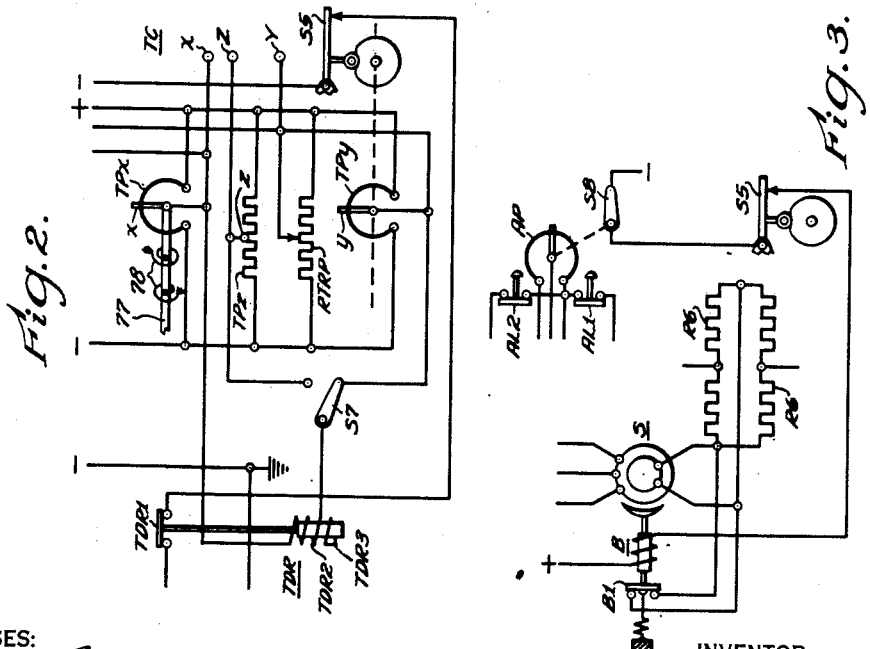

Fig. 2 diagrammatically illustrates a variation of the invention illustrated in Figs. 1a and 1b and is fragmentarily shown in the interest of simplicity, and Fig. 3 diagrammatically illustrates a further variation of the present invention. Again a fragmentary showing is made.

An important function of an aircraft flight control system or automatic pilot is to fly the aircraft straight and level at a given altitude. To this end the control must be quick to sense minor departures of the craft from fixed reference positions or to sense velocities about any of the three control axes to maintain a predetermined mode of operation. Additionally it is desirable that the control in response to stimuli of a piloting means manipulatable by the human pilot shall afford a coordination of control surface movement causing the craft to execute the maneuver indicated by the piloting means while maintaining the craft in equilibrium throughout the maneuver.

Control systems accomplishing this end usually include gyroscopes to detect errors in position of the craft. Such gyroscopes have been of the position type, that is, gyroscopes disposed on the craft to detect changes in flight attitude and to produce signals which when applied to suitable servo systems operating the control surfaces, tend to restore the aircraft to the desired flight attitude. Gyroscopes of this type however by reason of their mounting have a limited degree of freedom and, therefore, limit the maneuverability of the craft. If the maneuverability limit is exceeded the spin axis of the gyroscope is rotated with the craft about a given axis angularly deflecting the plane of the gyroscope rotor and the resulting processional response causes "tumbling" of the affected gyroscope or gyroscopes rendering the control useless.

A better control is obtainable by the use of velocity type gyroscopes which respond to the velocity of motion of the craft about the control axes thereof. Each produce an output torque proportional to the input velocity. Therefore, the output torque is usable in a control of the craft to check velocity errors about any of the control axes. Additionally by the introduction of suitable biasing means to the gyroscopes a controlled output thereof may be initiated to effect a control of the craft in the execution of certain maneuvers.

There are several advantages inherent in the provision of such a control. Importantly among these is the fact that a control may be provided which is responsive to the output torque of the gyroscope requiring negligible gyroscope output motion for operation. Hence the motion of the gyroscope about the output axis thereof may be limited. Since the input axis of such a gyroscope is constituted in a control axis of the aircraft, that is, the gyroscope is secured to the craft to respond to velocities or rates of motion about a given control axis, the limitation of output motion results in a restrained mounting thereof preventing the gyroscope from tumbling irrespective of the flight attitude of the aircraft. Thus, with a system of neutral gyroscopes, that is, gyroscopes which are balanced about the output axis thereof any type of maneuver may be executed by the application of a suitable biasing control to the gyroscopes, their being no maneuverability limit to the gyroscopes.

Another important advantage resulting from the control afforded by the velocity type gyroscopes is that a fast response to errors is had. Since a rate of motion must occur before an actual displacement may occur about any of the control axes it is possible to produce a suitable force or torque on the craft tending to oppose that producing the velocity error or disturbance without waiting for an actual displacement to occur. By suitably proportioning the control resulting from the velocity sense of the gyroscopes, it is possible to provide a control in which the actual excursions in position are of a minor nature and noticeable position errors may accumulate only over relatively long periods of time. Such errors may be corrected upon periodic checking of course and altitude by the human pilot. However, adequate control in some cases may require that a system of control as herein disclosed be capable of correcting position errors. Hence, means are herein provided for imparting directivity to each of the velocity type gyroscopes employed.

The system illustrated in the drawings embodies the velocity or rate gyroscopes mentioned above. One, a turn rate gyroscope TG controls a servo system including the rudder generator RG and the rudder motor RM which is connected to drive the rudder R of the aircraft through a system of gears. The second, a bank or roll rate gyroscope BG controls a servo system including the aileron generator AG and aileron motor AM which drives the ailerons A; and the third, a pitch rate gyroscope PG controls a servo system including the elevator generator EG and the elevator motor EM which drives the elevators E. Each gyroscope is oriented in the aircraft to respond to the rate of motion thereof about the corresponding control axis, the direction of flight being indicated by the arrow adjacent each gyroscope and the gyroscopes appearing as viewed from the side of the aircraft, that is, in elevation. A detailed discussion of the gyroscopes is given in the copending application of C. R. Hanna, Serial No. 785,983, only such details being hereinafter presented as are deemed essential to an understanding of this invention.

As illustrated, each gyroscope and excluding the spin axis has freedom for gyroscopic response about a single axis, otherwise the gyroscope is secured to the aircraft. Thus it will be observed that the turn gyroscope is sensitive only to angular motion about the turn axis of the aircraft, the turn axis lying in the plane of the drawings and being perpendicular to the axis about which the turn gyroscope is pivoted, which axis constitutes the output or precession axis of the turn gyroscope. The pitch gyroscope PG is similarly disposed, its output or precession axis being perpendicular to the pitch axis of the aircraft which is a line perpendicular to the plane of the drawings. The same applies to the bank gyroscope BG having its axis of freedom disposed at a right angle to the roll or bank axis of the aircraft which is a horizontal line in the plane of the drawings. In each case it will be observed that a rate of motion of the aircraft about any one of the turn, roll or pitch axes, applies a torque to the corresponding rate gyroscope tending to angularly displace the spin axis thereof. Accordingly, each gyroscope, having a degree angular freedom about an output axis at right angles to the axis of the applied torque, produces an output torque representative of the input velocity and the output torque is herein utilized to produce suitable control quantities for operating the associated servo system.

There are several ways in which the gyroscope output torques may be utilized to produce electrical quantities. For instance, the torque may be applied through a mechanical linkage to a carbon pile unit or other type of variable resistance unit to control the resistance thereof. The present embodiment utilizes a contact set comprising a pair of opposed stationary contacts having a movable contact secured to the gyroscope radially of the output axis thereof, disposed therebetween. Thus, in the case of the turn gyroscope precessional motion selectively engages the movable contact with either of contacts TC1 or TC2 which are, respectively, connected in series with one of a pair of differentially related field windings RGF1 and RGF2 of the rudder generator RG. The circuit for the field RGF1 extends from the positive conductor (+) through limit switch RL1 controlled by the rudder potentiometer RP, through the field RGF1 to contact TC1 and thence to the movable contact and the negative conductor (—). Similarly the circuit for field RGF2 extends from the positive conductor (+) through limit switch RL1 controlled by the rudder potentiometer RP, through the field RGF1 to contact TC1 and thence to the movable contact and the negative conductor (—). The bank and pitch gyroscope contact circuits are the same as that of the turn gyroscope aileron generator field AGF1 being connected in series with limit switch AL1 actuated by the aileron potentiometer AP and bank contact set BC1 across the power supply and field AGF2 being connected in series with limit switch AL2 and bank contact set BC2 across the power supply. Similarly elevator generator field EGF1 is connected in series with limit switch EL1 actuated by elevator potentiometer EP and the pitch contact set PC1 and field EGF2 is in series with limit switch EL2 and pitch contact set PC2, both series circuits being connected across the power supply.

The function of the gyroscope contacts in controlling the excitation of the field circuits of the generators is not simply that of making and breaking the circuit to the selected field but also that of controlling the current magnitudes in these circuits. This is accomplished by controlling the contacts so that hovering operation obtains in dependence of gyroscope output torques, suitable electromagnetic biases about the output axis of each gyroscope, and a degree of dynamic unbalance in the rotating system of the respective gyroscopes. By this means average currents are caused to flow in the field circuits corresponding to the detected error velocity about the corresponding control axis of the aircraft or corresponding to a set in turn rate at the handwheel HW.

The mentioned electromagnetic biases are produced by sets of electromagnets having armatures secured to the respective gyroscopes radially of their output axes. The specific structure of the electromagnets is not illustrated but reference may be had to the mentioned application of C. R. Hanna for these details. Generally, the electromagnets are designed with overlapping core and armatures so that appreciable changes in airgaps with armature movement do not occur over the limited range of armature motion so that the magnet force is independent of the armature position with respect to the magnet core, minimizing negative stiffness. Each magnet comprises a cylindrical core (not shown) having one extremity thereof projecting beyond the coil or coils wound thereabout. In the magnet systems shown in the drawings the cores are disposed in opposed relation and an annulus 32 of magnetic material forming the armature is secured to the associated gyroscope as previously described. The armatures each surround the associated core structures at the airgap formed between the confronting extremities of the cores. The axial length of each armature is sufficient that overlapping of the cores thereby exists throughout the limited range of armature motion.

The electromagnetic biases are produced by feed back voltages and control voltages applied to the respective coils of the magnets. The precessional response of each gyroscope is damped by a feed back voltage representative of the velocity of operation of the motor of the corresponding servo system. To this end each motor is connected as one leg in a bridge circuit which is balanced against the resistance of the motor armature winding when the motor is not rotating. Thus when the motors drive the corresponding control surfaces to equilibrium position and stop the currents circulating in the bridge circuits are balanced and the output voltage of each bridge is zero. However, during rotation the back E. M. F. of the respective motors increases the apparent armature resistance unbalancing the bridge circuit and producing an output voltage. Inasmuch as the motor fields RMF, AMF and EMF for the rudder motor, the aileron motor and the elevator motor are maintained at constant voltage across the power supply the back E. M. F. varies in magnitude and direction with the motor speed and direction of rotation producing a velocity voltage across the output terminals of each bridge circuit. The bridge circuit for the rudder motor includes a potentiometer P1 of which the tapped portions form adjacent legs and the remaining adjacent legs are formed by the resistor R1 and the armature winding of the rudder motor. Generator RG is connected across potentiometer P1, the extremities of which form the bridge circuit input terminals while terminals T1 formed by the tap of potentiometer P1 and the point between resistor R1 and the motor armature winding constitute the output terminals. The armature winding of aileron motor AM likewise forms one leg of a bridge circuit energized by generator AG and including a potentiometer P2 and a resistor R2, the output terminals being designated T2. Similarly the armature winding of the elevator motor EM forms one leg of the bridge including potentiometer P3 and resistor R3 which is energized by generator EG and has for its output terminals the terminals T3. In each instance, the velocity voltage taken from the respective bridge circuits is fed back in a negative sense, that is the electromagnetic bias resulting from the velocity feedback voltage opposes the precessional response of the corresponding gyroscope.

A second feed back voltage for each gyroscope is taken from the potentiometers RP, AP and EP the movable taps of which are driven by the corresponding servo system through electromagnetically operated clutches having coil CC1, CC2 and CC3 which are respectively energized from the power supply upon closure of switches S1 S2 and S3. Since the potentiometers are each actuated by a motor driving a control surface of the aircraft, the position of each movable tap and hence the tapped voltage corresponds to the position of the associated control surface. Thus the response of each gyroscope is also controlled in dependence of control surface position.

In order to obtain coordination of control surface movement during the execution of turns, the turn and bank gyroscopes TG and BG are additionally biased by voltages taken, respectively, from a skid voltage potentiometer SVP and a bank voltage potentiometer BVP, which are respectively connected in the field circuits of the aileron and rudder generators to be energized in dependence of the currents circulating therein when a set of the associated gyroscope's contacts is closed. For instance, regarding the skid voltage potentiometer SVP, when the contact BC1 is engaged by the movable contact actuated by gyroscope BG to energize field AGF1, a circuit for energizing skid voltage potentiometer SVP is completed beginning with the positive conductor (+) and including limit switch AL2, generator field AGF2, potentiometer SVP, contact BC1 and the movable contact engaged therewith to the negative conductor (—). Engagement of the movable contact with contact BC2 energizes the potentiometer SVP in a reverse direction in a circuit including the generator field AGF1 and limit switch AL1. Analogous considerations apply to the bank voltage potentiometer BVP. Thus upon the operation of either of the bank or turn gyroscopes the other of the two is biased in a direction to effect coordinated application of its control surface.

The turn, bank and pitch gyroscopes are additionally biased by voltages obtained from a potentiometer controlled by handwheel HW under the control of the human pilot. These potentiometers form part of the transient coordinator TC and are designated TP$x$, TP$y$ and TP$z$ of which, TP$y$ is actuated by the handwheel HW under the control of the human pilot, TP$x$ is actuated by the handwheel through a dashpot 70 and is centered by springs 78 and potentiometer TP$z$ is provided with a fixed tap corresponding to the center position of potentiometers TP$y$ and TP$x$. The dashpot 70 includes a plunger 71 actuated by the rack and pinion assembly 72 operated by rotation of the handwheel. The dashpot cylinder 73 having an orifice 74 therein is connected to a rack 75 meshing with a pinion 76 secured to a shaft 77 which connects with the movable tap $x$ of potentiometer TP$x$. The pair of spiral springs 78 produce opposed torques on the shaft 77 which are balanced when the movable tap occupies its central position. The dashpot time constant is selected to provide the required rate of change of position of movable tap $x$ under the influence of the spiral springs so that the necessary voltages are produced to control the aircraft for a coordinated turn. Thus rotation of handwheel HW displaces movable tap $y$ and through the dashpot rack and pinion linkage also displaces movable tap $x$. This produces a voltage between movable tap $x$ and the fixed tap $z$ of potentiometer TP$z$ which is used to bank the aircraft. Due to the unbalance of torques of the spiral springs 78 a restoring torque acts on shaft 77 tending to return movable tap $x$ to its neutral or center position. The rate of return of movable tap $x$, however, depends upon the rate of relative movement of the cylinder and piston of the dashpot which is such as to provide the required voltages. Thus as the voltage $x$ to $z$ decreases upon a restoring movement of movable tap $x$ a voltage $y$ to $x$ appears and increases at a rate corresponding to the rate of decrease of the voltage $x$ to $z$. The voltage $y$ to $x$ is used to control the turn and pitch motion of the craft.

In controlling the aircraft the voltage $x$ to $z$ which is first to occur is used to bias the bank gyroscope BG and the voltage $y$ to $x$ which builds up substantially as the voltage $x$ to $z$ decreases, is applied to the turn and pitch gyroscopes. The biasing systems of the turn and bank gyroscopes are polarity sensitive and, hence, bias the corresponding gyroscope one way or the other depending upon the polarity of the applied biasing voltage. On the other hand the section of the biasing system for the pitch gyroscope which receives the voltage $y$ to $x$ is not polarity sensitive and is arranged in its response to produce up elevator regardless of the polarity of the voltage $y$ to $x$.

Additionally it has been found that the pitch velocity in a turn varies substantially as the square of the angle of bank within a range of bank angles approaching 45° in either direction from the horizontal. Since the position of the elevators controls the pitch velocity suitable up elevator control requires that the elevators be applied approximately in accordance with the mentioned square law relation of bank angle and pitch velocity. In the instant case this is accomplished by providing linear response biasing systems for the turn and bank gyroscopes and a square law response biasing section in the pitch gyroscope biasing system to produce the needed up elevator for the indicated turn.

Considering now the control sequence which occurs upon rotation of the handwheel HW. first the voltage $x$ to $z$ is produced which effects a directed bias of the bank rate gyroscope depending upon the direction of handwheel rotation producing roll in the proper direction at a rate corresponding to the magnitude of the applied voltage. Thus the accumulation of bank angle is initiated. As the spiral springs 78 drive the potentiometer TP$x$ towards center at a rate depending on the time constant of the dashpot, the voltage $x$ to $z$ decreases and voltage $y$ to $x$ appears and increases substantially at the rate or any suitable function of the rate of decrease of voltage $x$ to $z$. Reduction of voltage $x$ to $z$ decreases the bias of the bank gyroscope returning the ailerons toward streamlined position as the proper angle of bank for the indicated turn is approached while the increasing voltage $y$ to $x$ controls the turn and pitch rate gyroscopes to apply the rudder and elevators in time phase with the bank angle to continuously match the turn and pitch velocity with the instantaneous angles of bank.

The pitch gyroscope is also biased by voltages taken from the pitch potentiometer PP. This potentiometer is actuated by push-pull motion of the handwheel affording reversed polarity biasing voltages when the movable tap is moved to opposite sides of neutral position, dives and climbs being executed by push-pull motion of the handwheel.

Directivity is imparted to all three gyroscopes. In the case of the bank gyro this is accomplished by making the gyroscope pendulous about its vertical output axis as illustrated. Thus this gyroscope in addition to responding to rates of motion about the roll axis is also sensitive to lateral acceleration and gravity, tending to assume a position about the vertical output axis thereof corresponding to the resultant of these two quantities. As a consequence the reference position for which this gyroscope initiates rolling motion of the craft corresponds to the proper angle of bank for the actual turn velocity of the craft.

In the case of the pitch gyroscope directivity is obtained from the vertical rate control VRC which produces biasing voltages in dependence of the rate of change of altitude and actual displacements in altitude. The vertical rate control includes a structure 50 having an opening therein forming a chamber which is sealed by a diaphragm 51 supported by a flexible annulus 51$a$. A small orifice 52 affords communication of the chamber with the atmosphere and diaphragm 51 is, therefore, displaced to the left or right as viewed with a force depending upon the rate of movement of the assembly vertically in the atmosphere. Diaphragm 51 is connected with pivoted arm 51$b$ carrying a movable contact at its lower extremity and an armature of an electromagnet assembly at its remaining extremity. The movable contact is disposed between a set of stationary contacts VR1 and VR2 which under the influence of the biasing control of the electromagnet associated therewith are caused to hover during operation. The vertical position reference is provided by the structure including the chamber 60 sealed by diaphragm 61, the motion of which is transmitted to arm 51$b$ by link system 61$a$ and pre-loaded spring assembly 61$b$ and thus also influences contact operation.

The vertical rate control electromagnet assembly is energized by a dive and climb potentiometer CDP actuated by push-pull motion of handwheel HW. This potentiometer is connected in a bridge circuit with the pair of coils CDP1 and CDP2 in which the tapped portions of the potentiometer form one pair of adjacent legs and coils CDP1 and CDP2 form the remaining pair of adjacent legs. The bridge circuit is connected across the positive and negative conductors and the movable tap of the potentiometer CDP is connected between the coils. Thus motion of the potentiometer tap to either side of center position correspondingly unbalances the coil currents and the armature is biased accordingly to cause engagement of the movable contact with one or the other of contacts VR1 and VR2. Contacts VR1 and VR2 are respectively connected in series with coils VR3 and VR4 of the vertical rate electromagnet. The arrangement is such that closure of a contact energizes the corresponding coil tending to open the contact, producing a hovering contact motion in which the electromagnetic biases balance the mechanical biases on arm 51b. The remaining pair of coils TRP1 and TRP2 form adjacent legs of a bridge circuit including the trim potentiometer TRP which is adjustable to compensate off center conditions. During periods of climbing and diving of the aircraft initiated at the handwheel, switch S6 opened by push-pull handwheel motion deenergizes coil SVC of solenoid valve SV which is spring biased open and provides communication of chamber 60 with the atmosphere.

In the case of the turn rate gyroscope TG directivity is obtained from the course control unit generally designated CU. Means for producing the fixed course signal voltages may be of any suitable form. One such means includes a gyro stabilized magnetic compass (not illustrated) embodied in the block entitled direction indicator. This type of device includes a magnetic pick-up commonly known as a flux valve. Briefly such a compass includes three stationary magnetic members disposed in 120° relation in a horizontal plane so that their permeability is altered by the horizontal component of the earth's magnetic field. When the three members are energized by a single phase alternating current, there is produced in three secondary windings forming part of the magnetic members, a set of voltages having double the applied frequency and which are unbalanced in magnitude depending upon the direction of the earth's magnetic field. Such voltage corresponds in every respect to single phase synchro transmitter voltages as the rotor of the synchro transmitter is turned. The voltage pattern of the flux valve is applied to the stator of a single phase synchro control transformer, the single phase output of which is amplified and employed to bias a directional gyroscope which in the instant application is of the position type. The bias forces acting about the input axis of the directional gyroscope produce precession movement thereof which by suitable mechanical connection with the rotor of a second synchro control transformer ST effects rotational movement thereof producing a strong output voltage pattern. This output voltage pattern is applied to the stator of a synchro unit S connected in a suitable network whereby a control of the tube 48 is had.

Vacuum tube 48 is provided with a pair of plates connected with the positive side of the source. The circuit for plate 48a including choke coil 48c and coil CU2 and the circuit for plate 48b including choke coil 48d and coil CU1. Choke coils 48c and 48d together with the shunt connected capacitor 48e form a filter network for the plate circuit tending to provide vibrationless electromagnet control for the turn gyroscope. Suppressor grid 48f is connected to the positive side of the supply source through one blade of switch S4. Control grids 48g and 48h are connected to diagonally opposite terminals of a bridge network including a potentiometer P4 and the secondary winding of a transformer TR1 in such a way that the voltages thereof are varied in opposite directions depending upon the voltage across the secondary winding of transformer TR1. The cathode 48k is connected to the negative side of the source, completing the power circuit for the tube.

A circuit including the secondary winding of transformer TR2 and series resistor R5 is connected across the remaining two terminals of the bridge network formed by a tap on the secondary winding of transformer TR1 and the adjustable tap of potentiometer P4. A constant bias is applied to the control grids 48g and 48h by the connection of the tap of potentiometer P4 to the positive side of the source, the adjustment being such as to balance the plate currents of the tubes when the error signal is zero. A reference voltage having a frequency synchronized with the frequency of the voltage of the rotor winding of synchro unit S is applied to the primary winding of transformer TR2 providing simultaneous voltage changes of both grid sections of the tube 48 in synchronism with the output of synchro unit S.

The output side of the synchro unit S is connected across a normally unbalanced resistance bridge network including a pair of resistors R6 in opposite legs. Resistors R6 are of equal ohmic value which is higher than the ohmic values of the resistors in the remaining two legs, unbalancing the bridge. Additionally resistors R6 are of material in which the resistance decreases as the applied voltage increases. Hence as the applied voltage to the bridge is increased the decreasing resistance of resistors R6 tends to decrease bridge unbalance. With this arrangement it is possible to increase the sensitivity of the amplifier to small error voltages and since the bridge unbalance is reduced by large error voltages, the range of voltages applied to the amplifier is not excessive.

The instantaneous phase relation of the error signal voltage with respect to the reference voltage on the grid circuit of the tube 48 depends upon the direction of angular displacement of the aircraft with respect to the set course, and drives one grid, more positive as the other is made less positive in a degree depending upon the extent of angular phase shift of the error signal, with respect to the reference signal. This push-pull operation of tube 48 unbalances the voltages of the tubes producing the course error voltage controlling coils CU1 and CU2 of the turn gyroscope biasing magnet.

Summing up the foregoing electromagnetic biases on the individual gyroscopes, the turn rate gyroscope electromagnet assembly is controlled by a rudder motor velocity voltage, a rudder position voltage, a skid voltage from the skid voltage potentiometer SVP, a piloting voltage ($y$ to $x$) from the system of turn potentiometers, and a course error voltage from the course control unit CU.

The bank rate gyroscope electromagnet assembly is controlled by an aileron motor velocity voltage from bridge circuit terminals T2, an aileron position voltage from aileron potentiometer AP, a bank voltage from bank voltage potentiometer BVP and a piloting voltage ($x$ to $z$) from the system of turn potentiometers.

The pitch rate gyroscope electromagnet assembly is controlled by an elevator motor velocity voltage taken from bridge circuit terminals T3, an elevator position voltage from elevator potentiometer EP, a piloting voltage ($y$ to $x$) from the system of turn potentiometers producing up-elevator, a piloting voltage from the pitch potentiometer PP for climbs and dives, and a combined vertical rate and vertical position voltage from the vertical rate control VRC.

These biasing voltages for the three gyroscopes are applied in any operating order and in various magnitudes depending upon the control requirements of the specific operating condition and the circuit connections are as follows:

Considering the turn gyroscope electromagnet system, the velocity feedback voltage taken from terminals T1 and the skid voltage taken from skid voltage potentiometer SVP are added in series in a circuit extending from terminal T1 at the movable tap of potentiometer P1, through a portion of skid voltage potentiometer SVP to the tap thereof, through coils SV1 and SV2, respectively, arranged on cores on opposite sides of the associated armature and terminating at the other terminal T1. Since coils SV1 and SV2 are on opposed cores with respect to the armature disposed therebetween, opposed torques are produced about the turn rate gyroscope output axis. The rudder position feedback voltage is applied by the connection of the rudder potentiometer RP in a bridge circuit with coils RP1 and RP2, coil RP1 being on a core with coil SV1 and coil RP2 being on the core with coil SV2, so that movement of the tap of the rudder potentiometer unbalances the currents of coils RP1 and RP2 unbalancing the opposed torques resulting therefrom. The piloting voltage ($y$ to $x$) is applied across a pair of series connected coils XY1 and XY2, respectively, disposed on oppositely disposed cores with coils RP1 and RP2 in a manner similar to coils SV1 and SV2, the trim potentiometer RTRP paralleling the turn potentiometer TP$y$ affording an adjustment for off-center condition. The course error voltage is applied to coils CU1 and CU2 as previously described arranged on a core assembly separate from that of coils RP1 and RP2 and the magnetic effects of the course control coils produce opposed and balanced torques about the return rate gyroscope output axis when the craft is on course.

While the magnetic effects of coils SV1 and SV2 and likewise the magnetic effects of coils XY1 and XY2 produce opposed torques about the turn rate gyroscope output axis due to their mounting on opposed core structures, the m. m. f.'s of the coils on the same core are arranged to add or subtract depending upon the control condition. If, for instance, coils RP1 and RP2 are regarded as the polarizing coils producing north poles on each core at the extremity adjacent the armature, then for one control condition the m. m. f.'s of coils SV1 and XY1 may oppose that of coil RP1 reducing the total biasing flux on that side of the armature while on the other side of the armature the m. m. f.'s of coils SV2 and XY2 will aid that of coil RP2 increasing the total biasing flux producing an unbalanced magnetic force acting in the direction of the core having the greater flux.

Also due to the biasing effect of coils RP1 and RP2, it will be appreciated that the response of the electromagnet system of the turn rate gyroscope is linear with respect to the energizing quantities for the several coils thereof and due to the fact that an armature assembly is employed in which overlapping gaps are provided the electromagnet system is relatively free of negative stiffness.

In the bank gyroscope electromagnet system, the velocity voltage and the bank voltage taken respectively from the pair of bridge circuit terminals T2 and the bank voltage potentiometer BVP are added in series in a circuit including a pair of coils BV1 and BV2 respectively disposed on opposite cores of the bank rate gyroscope electromagnet system. This circuit corresponds to its counterpart including coils SV1 and SV2 in the rudder section of the system. The aileron position voltage is applied by the connection of the aileron potentiometer AP in a bridge circuit with coils AP1 and AP2 in which the movable tap on AP controls the currents of coils AP1 and AP2. The piloting voltage ($x$ to $z$) is applied across series connected coils XZ1 and XZ2 respectively disposed on opposite cores. It is readily observed that this system of coils for the bank rate gyroscope electromagnet corresponds to that of the turn rate gyroscope electromagnet. The function thereof will be understood in connection with the description of the turn gyroscope electromagnet.

In the pitch gyroscope electromagnet system, the velocity voltage is applied to coils EV1 and EV2 arranged on oppositely disposed cores and being connected in series across the bridge circuit terminals T3. The elevator position voltage is applied by means of a bridge circuit in which the tapped portions of potentiometer EP form adjacent legs and a pair of coils EP1 and EP2 form the remaining two adjacent legs, the movable tap of EP being connected between the coils EP1 and EP2 to control the current distribution between the coils. Here again, the position coils EP1 and EP2 may be regarded as the polarizing coils producing north core poles adjacent the armature therefor. In one instance, the m. m. f. of coil EV1 opposes that of coil EP1 while that of coil EV2 aids that of coil EP2. Reversal of the elevator motor velocity voltage reverses the effect of the m. m. f.'s. The pitch potentiometer voltage is also applied to coils on these same cores. In accomplishing this the pitch potentiometer forms two adjacent legs of a bridge circuit including coils PP1 and PP2 as the remaining adjacent legs. The current distribution of coils PP1 and PP2 is controlled by connection of the movable tap of pitch potentiometer PP between the coils. Push-pull motion of handwheel HW drives the movable tap of potentiometer PP to either side of neutral position correspondingly controlling the currents of coils PP1 and PP2. A trim potentiometer ETRP having its movable tap common with that of the pitch potentiometer trims the bias of coils PP1 and PP2 to correct for off center conditions. Here also linearity of electromagnet response obtains due to the biasing effect of the opposed sets of coils. The biasing voltage from the turn potentiometer system ($y$ to $x$) is applied to a single coil XY3 of the pitch rate gyroscope electromagnet system. This coil is arranged on a core separate from the others and is disposed with respect to the armature therefor to produce biasing forces about the output axis of the pitch rate gyroscope to effect up-elevator. In view of the absence of polarizing and biasing coils on this electromagnet, the response is unidirectional irrespective of polarity of the $y$ to $x$ voltage and obeys the square law. Thus the provision of linear biases on the turn and bank rate gyroscopes and the square law bias on the pitch rate gyroscope matches the system control with the square law governing the relation of up-elevator to bank angle. The vertical rate and vertical position quantities of the vertical rate control VRC are applied to coils VR5 and VR6 in dependence of the operation of contact sets VR1 and VR2. These coils are respectively connected in series with contacts VR1 and VR2 and one coil or the other is energized depending upon which of contracts VR1 and VR2 is engaged by the movable contact associated therewith. Since a linear response is here desired, a pair of biasing coils C1 and C2 are respectively applied to the oppositely disposed cores carrying the coils VR5 and VR6, coil C1 being on a core with coil VR5 and coil C2 being on a core with coil VR6. Coils C1 and C2 are connected in series across the power supply and their m. m. f.'s are in the same direction as that of the corresponding one of coils VR5 and VR6. The magnetic biasing effect of these coils with respect to coils VR5 and VR6 is such as to produce a linear magnet response to the current of coils VR5 or VR6.

Thus it will be observed the hovering operation of the contacts of the gyroscopes as hereinbefore mentioned is influenced in each case by a multiplicity of magnetic biases which operate in varying degrees and at various intervals to produce the required biasing effect on the gyroscopes of the system, and if desired contact hovering may be augmented by introducing unbalance vibration about the output axis of each gyroscope. In the instant case this is accomplished by providing a degree of dynamic unbalance in the rotating system of each gyroscope.

To turn an aircraft the ailerons are applied to initiate an angle of bank together with the timed application of the rudder and elevators in a degree corresponding to the instantaneous angles of bank to provide the required turn and pitch velocities. In the functional description of the turn potentiometer system including the potentiometers TP$x$, TP$y$ and TP$z$ the voltages $y$ to $x$ and $x$ to $z$ are considered, the voltage $x$ to $z$ being the first produced biases, the bank gyroscope initiating roll velocity for the accumulation of bank angle and as the voltage $x$ to $z$ is reduced to streamline the ailerons a second voltage is produced which biases the turn and pitch rate gyroscopes. Thus it will be observed that the control sequence for the coordinated control of the surfaces maintaining equilibrium of the craft in a turn is obtained in the output of the turn potentiometers of the transient coordinator and the voltages applied across the respective biasing coils of the gyroscopes may be adjusted to the desired valves by means of series resistors R11, R12 and R13 in the respective circuits.

When the handwheel is rotated to turn the aircraft, it is desirable to disconnect the course control unit CU from the system so that its biasing effect tending to steer the plane along a fixed course is removed and at the same time to reorient this unit properly for the heading of the craft upon completion of a turn so that fixed course control may be resumed without delay. In a copending application of I. M. Holliday, G. R. Douglas and C. R. Hanna, Serial No. 785,984, filed November 14, 1947, entitled Control Systems and assigned to the assignee of this invention, this is accomplished by the expedient of a switch S5 operated by the handwheel which effectively connects and disconnects the course control unit and the main control system. However, the return of the handwheel to neutral position results in closure of the switch reconnecting the course control unit. In larger types of craft requiring several seconds to level off from a turn, say, having a bank angle of the order of 40 degrees, if handwheel rotation to neutral position is rapid the course unit may be connected in prior to the time the craft is leveled off for straight away flight and the course setting of the course unit is overshot by the craft resulting in several oscillations thereof prior to settling on the new course.

To avoid this, it is preferred that the course unit shall remain disconnected until the craft has leveled off, at which time reconnection of the course unit holds the craft on the instant heading at the time of leveling off. The structure by which this is accomplished is as follows:

The synchro unit S has a rotatable secondary winding, the rotative movements of which are controlled by a brake B. As previously described, this secondary winding is connected to the input terminals of the normally unbalanced bridge circuit containing resistors R6 which, in turn, controls the grids 48$g$ and 48$h$ of tube 48 in conjunction with the reference signal applied through transformer TR2. Thus it will be appreciated that the angular position of the rotor winding of synchro unit S with respect to the flux pattern of the primary winding thereof determines the instant heading of the aircraft and when the rotor is locked to prevent rotation, tendencies of the aircraft to turn result in a shift of the flux pattern of the primary winding with respect to the rotor winding producing the course error signal. The brake B is also provided with a contact set B1 which is closed when the brake is released. These contacts short the rotor winding of synchro S causing it to function as a repeater motor. It can, therefore, follow the rotating field of the primary winding during a turn.

The brake B is spring released and magnetically applied and its coil is connected in series across the power supply with the switch S5 actuated by the handwheel and contact set TDR1 of time delay relay TDR. Switch S5 is normally closed and, as shown, is cam actuated to open position for either direction of rotation of handwheel HW. Disregarding for the moment contact set TDR1, if a turn is indicated by handwheel rotation, switch S5 is opened deenergizing the brake coil which is spring biased to its released position, disengaging the rotor of synchro unit S and closing contacts B1 to short the rotor winding of synchro S. During the turn the rotating field of the synchro unit S caused by the changing orientation of the flux valve in the earth's magnetic field results in rotation of the rotor of the synchro in its function as a repeater motor, repeating the changing heading of the craft. Return of the handwheel to neutral promptly energizes the brake coil and the brake locks the rotor of the synchro. This, however, in some instances occurs prior to leveling off the craft.

By suitably timing the operation of contacts TDR1, a delay may be obtained in the reconnection or reslaving of the main section of the control system to the course control unit and this delay is preferably such as to reslave the system at the instant level flight is achieved. Inasmuch as the time delay varies depending upon the angle of bank and other factors, a constant time delay is not completely satisfactory. It is, therefore, preferred to control time delay relay TDR as some function of the angle of bank.

One way of accomplishing this is to energize the coil TDR2 of the time delay relay by a voltage which is maintained until the ailerons are streamlined for level flight. Such a voltage is obtained in Figs. 1a and 1b from the aileron potentiometer AP in a circuit including conductors APC connecting the coil TDR2 across a fixed center tap of the aileron potentiometer and the movable tap thereof. Now upon initiating a turn at the handwheel, switch S5 immediately causes the release of brake B, the contacts of which short the rotor of synchro S which functions as a repeater of the changing course of the craft. The voltage $x$ to $z$ applied to the biasing coils of the bank gyroscope deflect the ailerons which displaces the movable tap of potentiometer AP. Thus relay TDR is energized and opens its contacts TDR1 but since the series circuit is already open at switch S5, no immediate result follows. As the voltage $x$ to $z$ decreases and the ailerons are streamlined, the craft has assumed the bank angle for the indicated turn and potentiometer AP is centered deenergizing relay TDR which closes contacts TDR1. Again this has no effect, since switch S5 is yet open. As the desired heading is approached, the human pilot centers the handwheel. Voltage $x$ to $z$ builds up in the reverse direction oppositely deflecting the ailerons to return the craft to level flight. Relay TDR is, therefore, again energized prior to closure of the switch S5 opening contacts TDR1 and preventing the brake B from being energized. As the voltage $x$ to $z$ diminishes, streamlining the ailerons for level flight, relay TDR is deenergized and its contacts TDR1 complete the brake circuit applying the brake to the rotor of synchro unit S and removing the short circuit from the rotor winding. Thus the rotor winding is oriented properly for the new course.

For proper operation, it is essential that relay TDR have a fairly low drop-out voltage to prevent premature connection of the synchro unit with the main control system. If necessary, a small time delay on drop-out may be obtained by the addition of a short circuited coil TDR3, or, alternatively, by dashpot means.

In Fig. 2, the energizing voltages for relay TDR are taken from the potentiometers of the transient coordinator TD. By means of selector switch S7 either of voltages $y$ to $x$ or $x$ to $z$ may be applied to coil TDR2. In the position shown of switch S7, voltage $y$ to $x$ is applied. This voltage remains throughout the turn. For example, assume counter-clockwise motion of tap $y$. Tap $x$ in the first instant follows tap $y$ producing voltage $x$ to $z$. As the springs 78 return the tap $x$ to neutral under the control of the dashpot voltage $x$ to $z$ decreases to zero and voltage $y$ to $x$ appears energizing relay TDR. To level off the tap $y$ is returned to center driving tap $x$ from center in a clockwise direction maintaining voltage $y$ to $x$ and producing voltage $x$ to $z$ of reversed polarity. Movement of tap $x$ to center under the bias of springs 78 thus reduces both voltages to zero simultaneously and the voltage $y$ to $x$ remains until the craft has leveled off.

Since the switch S5 controls the release of the rotor of synchro S and its connection for repeater operation, the initial characteristics of the voltages $y$ to $x$ and $x$ to $z$ are immaterial. But since both are present during leveling off and remain until level flight is achieved, it is apparent that each is suitable for the control purpose described.

The control may be simplified as shown in Fig. 3 by inserting a switch S8 in series with switch S5 and controlling switch S8 by one of the rudder, aileron or pitch potentiometer devices. With this construction relay TDR may be eliminated and the coil of relay B connected in series with switches S5 and S8 across the power supply. Since all three potentiometers are displaced prior to the return of the handwheel to neutral position and remain displaced until level flight is achieved, switch S8 will always control the reconnection of the course control to the main system. Analogous considerations apply to the connection of the switch S8 to be operated by the shaft 77 which drives movable tap $x$ of potentiometer TPx.

The foregoing disclosure and the showing made in the drawings are merely illustrative of the principles of this invention and are not to be interpreted in a limiting sense. The only limitations are to be determined from the scope of the appended claims.

I claim as my invention:

1. In a control for a conveyance operable in space, the combination of, regulating means for stabilizing said conveyance, piloting means for controlling said regulating means, a synchro unit having a stator winding, a rotor and a rotor winding; circuit means for energizing the stator winding of the synchro unit, means responsive to the angular error in heading of said conveyance with respect to a predetermined heading for rotating the electrical field of said synchro unit, circuit means for applying the electrical output of said rotor winding to said regulating means to effect a control thereof, electromagnetic means for engaging and releasing said rotor, when energized and deenergized, respectively; switching means responsive to said electromagnetic means for shorting said rotor winding upon operation of said electromagnetic means to release said rotor, a pair of switches connected in series with said electromagnetic means for controlling the energization thereof, means responsive to said piloting means for operating one of said switches, and means responsive to said regulating means for operating the other of said switches.

2. In a control for a conveyance operable in space, the combination of, turn control means, roll control means and pitch control means; piloting means connected with each of said turn control means, roll control means and pitch control means for controlling each of said turn control means, roll control means and pitch control means; compass means connected to said turn control means for controlling said turn control means, a first control element connected to and responsive to said piloting means and connected to said compass means for rendering said compass means ineffective to control said turn control means, and a second control element connected to erable in conjunction with said first control element and responsive to said roll control means and opment for rendering said compass means effective to control said turn control means.

3. In a control for an aircraft having ailerons and a rudder, the combination of, piloting means for producing a first control quantity, means for reducing said first control quantity and producing a second control quantity, first servo means responsive to said first control quantity for driving said ailerons, second servo means responsive to said second control quantity for driving said rudder, compass means for controlling said second servo means, a first control element responsive to said piloting means for preventing said compass means from controlling said second servo means, a control device actuated by one of said servo means, and a second control element responsive to said control device and operable in conjunction with said first control element for rendering said compass means effective to control said second servo means.

4. In a control for an aircraft having ailerons and a rudder, the combination of, piloting means for producing a first control quantity, means for reducing said first control quantity and producing a second control quantity, first servo means responsive to said first control quantity for driving said ailerons, second servo means responsive to said second control quantity for driving said rubber, compass means for controlling said second servo means, a first control element responsive to said piloting means for preventing said compass means from controlling said second servo means and a second control element responsive to one of said control quantities and operable in conjunction with said first control element for rendering said compass means effective to control said second servo means.

5. In a control for an aircraft having ailerons and a rudder, the combination of, aileron servo means for driving said ailerons, rudder servo means for driving said rudder, a turn gyroscope responsive to the rate of turning movement of said aircraft for controlling said rudder servo means, a bank gyroscope responsive to the rate of rolling movement of said aircraft for controlling said aileron servo means, piloting means normally occupying a neutral position and operable in each of two directions of motion from said neutral position to control both of said turn and bank gyroscopes, directional control means for controlling one of said gyroscopes, electromagnetic means when energized for rendering said directional control means effective to control said one gyroscope and when deenergized preventing said directional control means from controlling said one gyroscope, a circuit means including a pair of series connected switches connected with said electromagnetic means, switch operating means responsive to said piloting means for operating one of said switches, said switch operating means closing said one switch when said piloting means is in neutral position and opening said one switch upon motion of said piloting means in each of said two directions from said neutral position, and means responsive to movement of one of said rudder and said ailerons from neutral position for opening the other of said switches.

6. In a control for an aircraft having ailerons and a rudder, the combination of, piloting means for producing a first electrical quantity, means for reducing said first control quantity and producing a second control quantity, aileron servo means responsive to said first electrical quantity for driving said ailerons, rudder servo means responsive to said second electrical quantity for driving said rudder, a synchro unit having a stator winding, a rotor and a rotor winding; means for energizing said stator winding, directional control means for rotating the electrical field of said stator winding in dependence on the heading of said aircraft, circuit means responsive to the electrical output of said rotor winding for controlling said rudder servo means, electromagnetic means movable to each of two positions for engaging and releasing said rotor, said electromagnetic means when energized engaging said rotor and releasing said rotor when deenergized, circuit means for shorting said rotor winding in response to movement of said electromagnetic means to a position releasing said rotor, a pair of switches, circuit means connecting said switches in series with said electromagnetic means for controlling the energization of said electromagnetic means, means responsive to said piloting means for controlling one of said switches, and means responsive to one of said electrical quantities for controlling the other of said switches.

7. In a control for an aircraft having ailerons and a rudder, the combination of, piloting means for producing a first electrical quantity, means for reducing said first control quantity and producing a second control quantity, aileron servo means responsive to said first electrical quantity for driving said ailerons, rudder servo means responsive to said second electrical quantity for driving said rubber, a synchro unit having a stator winding, a rotor and a rotor winding; means for energizing said stator winding, directional control means for rotating the electrical field of said stator winding in dependence on the heading of said aircraft, circuit means responsive to the electrical output of said rotor winding for controlling said rubber servo means, electromagnetic means movable to each of two positions for engaging and releasing said rotor, said electromagnetic means when energized engaging said rotor and releasing said rotor when deenergized, circuit means for shorting said rotor winding in response to movement of said electromagnetic means to a position releasing said rotor, a pair of switches, circuit means connecting said switches in series with said electromagnetic means for controlling the energization of said electromagnetic means, means responsive to said piloting means for controlling one of said switches, and mechanical means connecting the other of said switches to said aileron servo means to be driven thereby.

8. In a control for an aircraft having ailerons and a rudder, the combination of, piloting means for producing a first electrical quantity, means for reducing said first control quantity and producing a second control quantity, aileron servo means responsive to said first electrical quantity for driving said ailerons, rudder servo means responsive to said second electrical quantity for driving said rudder, a synchro unit having a stator winding, a rotor and a rotor winding; means for energizing said stator winding, directional control means for rotating the electrical field of said stator winding in dependence on the heading of said aircraft, circuit means responsive to the electrical output of said rotor winding for controlling said rudder servo means, electromagnetic means movable to each of two positions for engaging and releasing said rotor, said electromagnetic means when energized engaging said rotor and releasing said rotor when deenergized, circuit means for shorting said rotor winding in response to movement of said electromagnetic means to a position releasing said rotor, a pair of switches, a circuit means connecting said switches in series with said electromagnetic means for controlling the energization of said electromagnetic means, means responsive to said piloting means for controlling one of said switches, a potentiometer having a movable tap, means for energizing said potentiometer, means connecting said movable tap to said aileron servo means to be driven thereby, means forming a terminal constituting the substantial midpoint of the voltage drop across said potentiometer, an electromagnet assembly for operating the other of said switches and circuit means connecting said electromagnet across said movable tap and said terminal.

CLINTON R. HANNA.

REFERENCES CITED

The following references are of record in the file of this patent:

UNITED STATES PATENTS

| Number | Name | Date |
|---|---|---|
| 1,418,335 | Sperry | June 6, 1922 |
| 2,051,974 | Warner | Aug. 25, 1936 |
| 2,066,194 | Bates | Dec. 29, 1936 |
| 2,144,616 | Carlson | Jan. 24, 1939 |
| 2,466,702 | Hamby | Apr. 12, 1949 |
| 2,471,821 | Kutzler et al. | May 31, 1949 |